F. M. WARNER.
ART OF COLOR PHOTOGRAPHY.
APPLICATION FILED JAN. 16, 1919.

1,358,802.                              Patented Nov. 16, 1920.

Inventor:
Florence M. Warner
by her Attys:
Philipp Sawyer Rice Kennedy

UNITED STATES PATENT OFFICE.

FLORENCE M. WARNER, OF NEW YORK, N. Y.

ART OF COLOR PHOTOGRAPHY.

1,358,802.  Specification of Letters Patent.  Patented Nov. 16, 1920.

Application filed January 16, 1919. Serial No. 271,516.

*To all whom it may concern:*

Be it known that I, FLORENCE M. WARNER, a citizen of the United States, residing at 17 East 35th street, New York city, county of New York, and State of New York, have invented certain new and useful Improvements in the Art of Color Photography, fully described and represented in the following specification and the accompanying drawings, forming a part of the same.

This invention relates to improvements in the art of producing photographs in natural colors, and the invention has for its especial object the production of transparent positive photographs in natural colors from a negative taken of a subject on a sensitive plate provided with a color screen having a regular recurring pattern of lines, dots or figures.

It has been proposed in the art of color photography to produce positives in color from negatives taken through a color screen having a regular recurring pattern of lines, dots or figures. In this method a negative is taken through a lined screen on a sensitive plate separate from the screen, and a positive is made from this negative and viewed through a screen similar to the taking screen. This method is open to the objection that it is impossible to get the optical contact between the taking screen and the sensitive surface of the plate, and owing to the number of the lines to the inch which it is necessary to use (from 200 to 400) to obtain color results this lack of optical contact caused a parallax error which resulted in the production of positives which showed imperfect colors when viewed with the viewing screen. To overcome this parallax error it has been proposed to produce the negative on a special sensitive surface superposed directly on the color screen itself. The negative obtained by this method is, through a complicated series of steps reversed to a positive. While good positives may be obtained by this method, the method has the drawback that but one positive can be obtained. It has further been proposed to produce a negative on an emulsion superposed directly on a plate having a color screen of regular recurring lines, dots or figures, and making a positive from this negative on a similar sensitized color screen plate. Positives produced by this method, however, are unsatisfactory, and are difficult to make due to the fact that the exposure has to be made through the colors of the two screen plates, and this has been found so difficult to accomplish as to make the method impracticable.

I have devised a method, novel, so far as I know, for overcoming the difficulties and drawbacks of the methods referred to by which I can successfully produce positive transparencies in any number and in natural colors from a negative made on a screen plate having the sensitive emulsion on the screen plate itself.

I have discovered that positives in any number may be made from a negative taken on a sensitive plate having a colored screen of lines, dots or figures, by making a monochrome positive from such a negative on a panchromatic plate, that is, a plate having an emulsion sensitive to all colors, so as to produce the true black and white condition, if the positive is taken under what may be termed balanced conditions of light and emulsion. By this "balanced conditions" is meant balancing or compensating the sensitiveness of the emulsion and the printing power of the light. As an illustration, if a negative were made under acetylene or nitrogen light for a given emulsion, the same emulsion could not be successfully used with daylight, but a different emulsion equally sensitive to the three primary colors of the screen plate through which the positive is printed would have to be employed. This balancing of conditions may be effected either by the use of a compensating filter or by adjusting the color sensitiveness of the emulsion to the particular source of light used for effecting the impression.

In carrying out my invention, I may proceed as follows, the description being read in connection with the accompanying drawings which illustrate one method of effecting the objects of the invention.

In these drawings—

Figure 1:
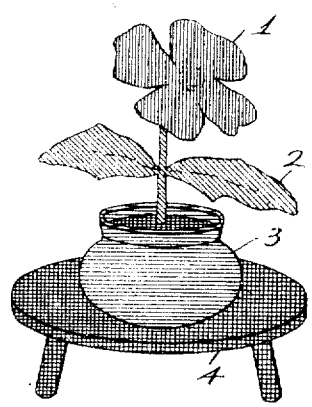
Figure 1 is an outline of a subject to be photographed.

A negative is made on a plate produced by coating a screen plate, such as shown in the patent to Powrie No. 802,421, dated October 24, 1905 having a pattern of recurring lines of the three primary colors, green, blue and red, with a sensitive emulsion, the emulsion being placed directly on the colored lined surface of the plate. As shown in Fig. 1, the subject chosen for illustration is a red flower 1, with green leaves 2, in a blue pot 3, standing on a black table 4. An exposure of this subject is made on a screen plate having alternate parallel lines of red, marked 5, green marked 6, and blue marked 7. This exposure is made in a camera equipped with a compensating filter, that is, a filter which renders the action of the light passing through the red, blue, and green elements of the screen, substantially equal. This negative after exposure is developed and fixed in the usual manner, and there is produced a negative image in colors complementary to those of the subject. These colors are indicated by the lines, the black lines 8 being the lines through which the red lines of the screen have let pass the red light of the red flower 1 and exposed the sensitive coating of the plate. The emulsion over the green and blue lines 9 and 10 has been unacted on so that when the negative has been developed and fixed these lines will appear clear. The same action occurs for the green leaves, the silver emulsion over the green lines in this instance being exposed and being indicated by the black lines 11, the emulsion over the blue and red lines 12 and 13 being unexposed; and the same action has occurred in the negative of the bowl, the silver emulsion over the blue lines having been acted on and forming the black lines indicated at 16, the emulsion over the green and red lines 14 and 15 having been unacted on. None of the silver emulsion over the lines back of the black table of the plate has been acted on and the silver is unexposed, this condition being indicated by the lines 17. From this negative a positive is printed on a plate having a pan-chromatic emulsion, that is, an emulsion sensitive to all colors, so as to produce a monochrome having a good black and white condition, that is, in which a true black and white is obtained, and not a black or white tinged with color. In printing this positive, any source of light may be employed. Preferably this would be an artificial white light, such as that produced by acetylene gas or that produced by the well known nitrogen lamp. Where the printing is to be effected by such light, the emulsion of the plate will be of such character that it is equally sensitive to the green, blue and red of the negative screen and in such case the compensating filter may be omitted in the printing. If, however, the printing is to be effected by natural light, I use a compensating filter of any well known type, this filter rendering the emulsion equally sensitive to the three colors of the screen, and where such filter is used no change in the emulsion is necessary. I prefer, therefore, to provide a plate with an emulsion equally sensitive to the three colors where the light used is to be acetylene or nitrogen or a similar white light, and if other light is used to employ the compensating filter.

Figure 2:
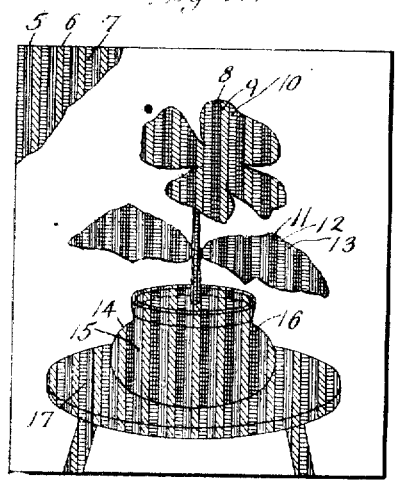
Fig. 2 is a face view of a negative of the subject taken on a lined screen plate the emulsion being shown removed to illustrate the screen.
Figure 3:
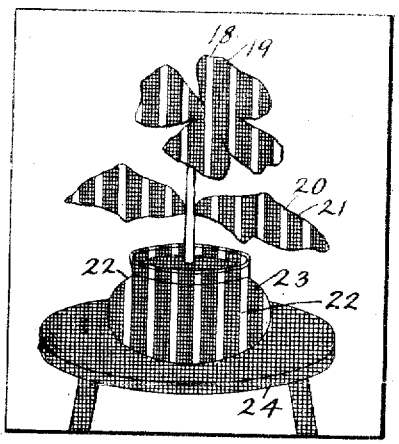
Fig. 3 is a face view of a monochrome positive taken on an unlined plate from the negative of Fig. 2.

This monochrome positive is then developed and fixed in the usual manner and with the usual developing and fixing agents. After developing and fixing, the monochrome positive appears as shown in Fig. 3, the red flower appearing in lines 18 and 19, the lines 18 corresponding to the lines 8 of the negative of Fig. 2, and the lines 19 corresponding to the lines 9 and 10 of negative of Fig. 2; similarly the green leaves appear in lines 20 and 21, the lines 20 corresponding to the green lines 11 of the negative of Fig. 2, and the lines 21 corresponding to lines 12 and 13 of the negative of Fig. 2; similarly with the blue pot in which the lines 22 correspond to the lines 16 of the negative of Fig. 2 and the lines 23 correspond to the lines 14 and 15 of the negative of Fig. 2, and the table 24 is a black silver deposit covering all the lines, as shown at 17 of Fig. 2.

Figure 4:
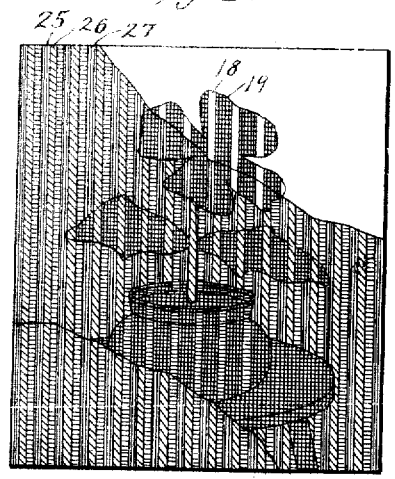
Fig. 4 is a face view of the monochrome positive of Fig. 3 superposed on a lined plate similar to the lined plate of Fig. 2, the screen of Fig. 4 and the monochrome positive, each being partially removed to show the relation of the superposed plates.

I then superpose the positive plate in registered position with a color screen similar to the screen through which the negative was taken, such as the lined screen of the Powrie patent just referred to, this screen presenting parallel lines 25, 26, and 27 of alternate red, green, and blue colors. The two plates are superposed and adjusted with respect to each other, and mounted together. When properly adjusted the subject photographed will appear as a transparency in its original colors as will be well understood by those skilled in the art, and this condition is illustrated in Fig. 4. As shown in this figure the monochrome positive and the lined screen plate are so adjusted that the lines 18 of the red portion of the subject are superposed over the red lines 25 of the screen plate; the green lines 20 are superposed over the green lines 26 of the plate, and the blue lines 22 are superposed over the blue lines 27 of the plate.

It will be seen by my method of procedure that a very simple method has been devised by which any number of colored transparent positives may be reproduced from a colored negative with great accuracy and with a minimum of necessary steps and expense, and with little liability of failure.

While the method described by me is the preferred one, and I prefer to use a lined plate as distinguished from a plate having a recurring pattern other than lines, it will be understood that my invention is not restricted to a lined plate, but can be used with a wide variety of plates in which the color screen has varying regular recurring patterns of figures other than lines.

What I claim is:

1. The method of producing a positive transparency in natural colors, which consists in making a negative of a subject on a sensitive plate having a color screen of different colored elements, making a monochrome positive from this screen negative on a plate coated with a panchromatic emulsion, and mounting the monochrome positive in registered position with a color screen similar to the screen through which the negative was taken.

2. The method of producing a positive transparent photograph in natural colors, which consists in making a negative of a subject on a sensitive plate having a color screen in the form of a regular recurring pattern of lines, dots or figures in the three primary colors, making a monochrome positive from this negative on a plate coated with a panchromatic emulsion, and mounting the monochrome positive with a color screen having the same regular recurring pattern of lines, dots or figures through which the negative was taken.

3. The method of producing a transparent positive photograph in natural colors, which consists in making a negative of a subject on a sensitive plate having a color screen of different colored elements, making a monochrome positive from the negative on a panchromatic plate under balanced conditions of light and emulsion, and mounting the monochrome positive with a color screen similar to the screen through which the negative was taken.

4. The method of producing a positive transparent photograph in natural colors, which consists in making a negative of a subject on a sensitive plate having a color screen of different colored elements, making a monochrome positive from this negative on a panchromatic plate through a compensating filter, and mounting the monochrome positive in registered position with a color screen similar to the screen through which the negative was taken.

5. The method of producing a positive transparency in natural colors, which consists in making a negative of a subject on a sensitive plate having a color screen, of different colored elements, making a monochrome positive from a negative on a surface coated with a sensitive panchromatic emulsion, and mounting the monochrome positive in registered position with a color screen similar to the screen through which the negative was taken.

6. The method of producing a positive transparency in natural colors, which consists in making a negative of a subject on a sensitive photographic support having a screen of different colored elements, making a monochrome positive from this screen negative on a sensitive support, and mounting the monochrome positive in registered position with a color screen similar to the screen through which the negative was taken.

In testimony whereof, I have hereunto set my hand, in the presence of two subscribing witnesses.

FLORENCE M. WARNER.

Witnesses:
 B. M. BERKOWITZ,
 JOHN H. POWRIE.